Feb. 8, 1938.   N. ROACH   2,107,802

MEANS FOR MAKING THREADED CONNECTIONS

Filed Nov. 13, 1937

INVENTOR
NATHAN ROACH
BY
Brackett, Hyde, Higley & Mayer
ATTORNEYS

Patented Feb. 8, 1938

2,107,802

UNITED STATES PATENT OFFICE 2,107,802

MEANS FOR MAKING THREADED CONNECTIONS

Nathan Roach, Cleveland, Ohio, assignor to The Cleveland Brass Manufacturing Company, Cleveland, Ohio, a corporation of Ohio Application November 13, 1937, Serial No. 174,294

2 Claims. (Cl. 285—48)

This invention relates to improvements in means for making a threaded connection and is particularly applicable in such cases as where an off-take member, such as a cock is to be threaded into a pipe or other pressure chamber.

An object of the present invention is the provision of a threaded connection between two members with a bushing lying between them, the arrangement of the parts being such that in assembled relation the material of the bushing is so compressed and deformed between the two members as to withstand heavy pressure.

Another object of the present invention is the provision of members of special form arranged to be connected together by threaded means, and a bushing of special form and material arranged to be engaged between the members as they are threaded together and in such a manner as to deform the bushing.

Another object of the invention is the provision of a method of forming a threaded connection between two members including a pressure sealing bushing wherein the rotation of one of the members drives a bushing thread into the other member and also drives the rotating member into the bushing, whereby a final sealing effect is produced.

Other novel arrangements of the parts, novel materials of which certain of the parts are constructed, and novel steps in the method will be apparent from the accompanying drawing and specification and the essential features will be summarized in the claims.

Figure 1:
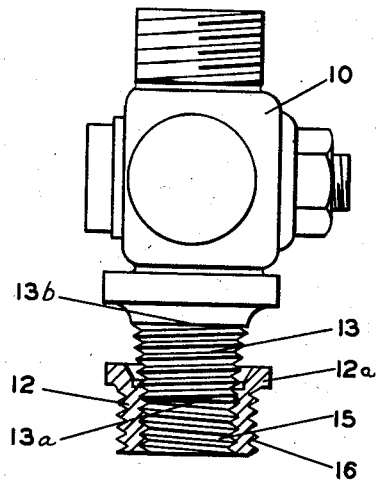
Figure 2:
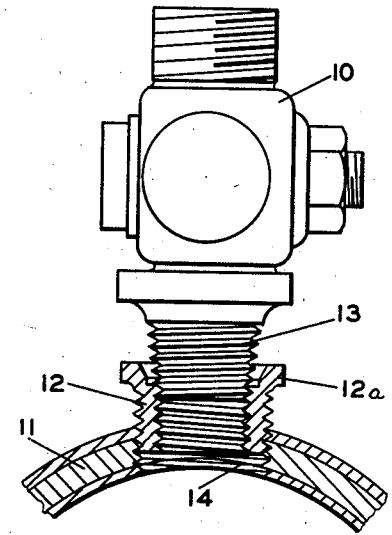
Figure 3:
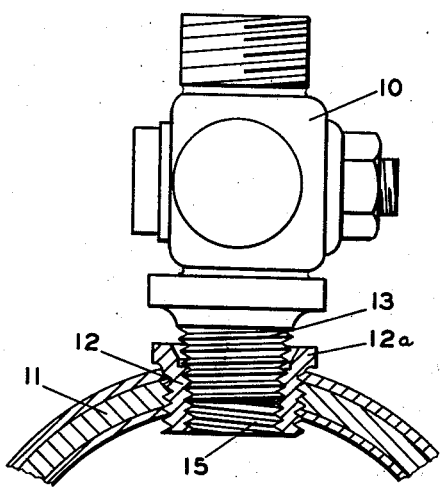
Figure 4:
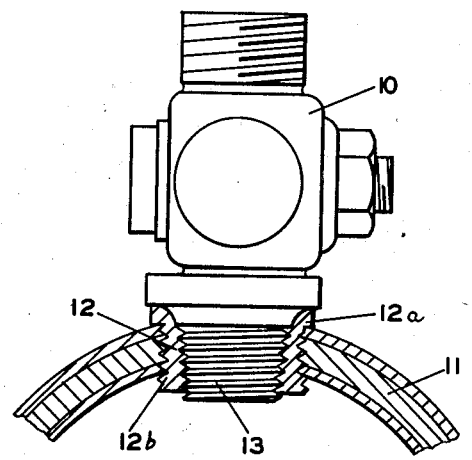

In the drawing, Fig. 1 is a view of a take-off member, such as a "corporation cock" engaging a bushing, this being a preliminary positioning of the parts for the carrying out of my invention; Fig. 2 is a view of the parts of Fig. 1 with the bushing thereof inserted in a pipe; Fig. 3 is a view of the parts of Fig. 2 showing their position after the corporation cock has been rotated to drive the bushing into the pipe; while Fig. 4 is a similar view showing the parts after the cock and bushing have been driven to final position in the pipe.

For purposes of illustration I have shown a manner of making a connection between a corporation cock 10 and a pipe 11, although it will be understood that my threaded connection may have many other applications.

A particular advantage of the invention as here shown is that pipe mains are often tapped and connections made under pressure and my invention discloses members which may be used in such a pipe tapping operation utilizing a standard machine for tapping pipes under pressure and wherein the connection when made will withstand a very heavy pressure. At the same time my invention is very simple, requires only standard tools and is very easily made.

The essential parts for practicing my invention are the take-off member, such as a corporation cock 10, the pipe or other pressure chamber to which connection is made at 11, and a bushing 12. The take-off member is provided with a male thread 13 and the pipe 11 is provided with a female thread 14. The bushing 12 has an internal thread 15 adapted to coact with the thread 13 and an external thread 16 adapted to coact with the thread 14. One of the threads 13 or 14 is tapered so as to produce a compressing and deforming effect on bushing 12 as will hereinafter appear. Preferably the male member 13 is provided with the tapered thread. The relative proportion of the parts is such that the dimension 13a across the narrower portion of the taper 13 substantially corresponds to the diameter of the thread 15 so that the parts may be placed in the position of Fig. 1 without any substantial distortion of the bushing 12. The dimension of the tapered thread as it widens from the point 13a is of greater diameter than the thread 15 up to the point 13b where the tapered thread reaches its greatest diameter. The thread 16 is of substantially the same diameter as the thread 14.

The bushing 12 is preferably of a metal which is compressible and deformable between the cock 10 and the pipe 11 when the parts are screwed together. I find there are several suitable materials for this bushing. For instance, it may be made of substantially pure lead, or for purposes of better machinability it may be made of lead containing up to five per cent copper or of lead containing up to five per cent antimony. I find an alloy of ninety-seven per cent lead and three per cent copper is very satisfactory and of good machinability. The same is true of an alloy of ninety-seven per cent lead and three per cent antimony. In the making of a threaded connection according to my invention, the parts may be assembled in any suitable sequence so that eventually the parts arrive at the position of Fig. 3 where the bushing 12 is threaded into the pipe 11 to the point where its advance is obstructed by the shoulder 12a on the bushing. From this point on, rotation of the cock 10 drives the tapered thread 13 into the bushing 12, expanding the material of the bushing outwardly as the taper progresses until the parts arrive substantially at the position of Fig. 4. At this time the material of the bushing is deformed between the threads 13 and 14, there being of course a greater deformation at the upper part of the bushing as viewed in Fig. 4, that is to say where the taper 13 is of the greater diameter.

Referring to Fig. 4, it will be noted also that there is substantially a sealing effect where the shoulder 12a engages the outer portion of the pipe 11 and there is also a sealing effect at the point 12b where the bushing on the inner face of the pipe 11 has been distorted outwardly by the pressure exerted on the bushing as the parts are threaded together. This material at 12b is deformed radially outwardly and adds to the sealing effect at this point.

A special advantage of my improved threaded connection is its applicability for use in a standard machine for tapping pipes and making connections under pressure. In such a machine after the opening in the pipe 11 or other pressure chamber to which connection is to be made, has been drilled and threaded, the cock 10 with the bushing 12 in the position of Fig. 1 may be inserted in the chamber of the tapping machine and the usual driving or rotating plug secured to the upper connection of the cock 10. The bushing 12 is then inserted in the threaded opening in the pipe 11 as shown in Fig. 2, all of this of course within the chamber of the tapping machine. Rotation of the cock 10 within the machine will then drive the bushing 12 to the position of Fig. 3, meanwhile the tapered thread 13 may have somewhat farther entered the thread 15 as indicated in Fig. 3. Further rotation of the cock 10 will drive the tapered threads 13 eventually to the position of Fig. 4, deforming the bushing 12 as there indicated and forming an exceedingly tight joint.

I have constructed such connections wherein the bushing 12 had an internal diameter of one and one-eighth inches tapped ten threads per inch, and an outside diameter of one and three-eighths inches tapped twelve threads per inch. The threaded portion of the cock 10 measured 1.092 inches at the point 13a and tapered outwardly at the rate of two inches per foot. This of course also carried ten threads per inch. I have tested this bushing when forming part of a threaded connection in a pipe 11 having inner and outer protective coatings of tar or the like and when a section of six inch extra heavy pipe provided with my novel connection had its ends closed with malleable iron caps and was subjected to hydrostatic pressure, where the bushing 12 was made of lead the joint withstood 2,000 pounds per square inch pressure; where the bushing was of ninety-seven per cent lead and three per cent copper, the joint withstood 2,200 pounds per square inch; and where the bushing was formed of ninety-seven per cent lead and three per cent antimony the joint still held at 2,600 pounds per square inch, at which time the caps let go on the six inch pipe.

From all of the above it will be seen that I have provided a very simple but efficient connection between two threaded members and also one which particularly adapts itself for use in making connections with a tapping machine as applied to pipes under pressure. At the same time I have provided a novel combination between a tapered threaded member and a bushing of special material which is adapted to form a very efficient joint.

What I claim is:

1. In a connection between a hard metal threaded member and a hard metal wall having a threaded opening therein, said wall being subjected to fluid pressure, a bushing of a soft metal having a deformability similar to lead having threaded engagement between its outer face and said wall and having threaded engagement between its inner face and said member, and portions at each end of said bushing beyond its engagement with said wall extending radially outwardly beyond the diameter of said wall opening.

2. A pipe joint comprising a bushing of material having a deformability similar to lead, said bushing having internal and external threads, a hard metal wall having an opening therein threaded to receive the external thread of said bushing, and a hard metal off-take member having a tapered thread, the portion of said tapered thread of lesser diameter being adapted to engage with said internal bushing thread and the portion of said tapered thread of greater diameter exceeding the diameter of said internal bushing thread, whereby the narrower portion of said taper threaded member may be engaged in said bushing and when the external thread of said bushing engages the thread of said wall opening the taper threaded member will first drive said bushing ahead of it and later expand said bushing to deform it into tight engagement with said wall.

NATHAN ROACH.